(12) United States Patent
Goodman (10) Patent No.: US 6,904,457 B2
(45) Date of Patent: Jun. 7, 2005

(54) AUTOMATIC FIRMWARE UPDATE OF PROCESSOR NODES

(75) Inventor: Brian Gerard Goodman, Tuscon, AZ (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 09/755,832

(22) Filed: Jan. 5, 2001

(65) Prior Publication Data

US 2002/0091807 A1 Jul. 11, 2002

(51) Int. Cl.$^7$ ............................................ G06F 15/177
(52) U.S. Cl. ...................... 709/221; 709/220; 717/171; 717/173; 717/176; 717/178; 713/1; 713/100
(58) Field of Search ............................... 709/220, 221; 713/1, 100; 717/171, 173, 176, 178

(56) References Cited

U.S. PATENT DOCUMENTS

| | | | |
|---|---|---|---|
| 5,485,601 A | | 1/1996 | Ching |
| 5,586,304 A | | 12/1996 | Stupek, Jr. et al. |
| 5,588,143 A | | 12/1996 | Stupek, Jr. et al. |
| 5,623,604 A | * | 4/1997 | Russell et al. ............. 717/167 |
| 5,809,287 A | | 9/1998 | Stupek, Jr. et al. |
| 5,815,722 A | | 9/1998 | Kalwitz et al. |
| 5,826,075 A | | 10/1998 | Bealkowski et al. |
| 5,870,610 A | * | 2/1999 | Beyda ........................ 717/173 |
| 5,960,189 A | | 9/1999 | Stupek, Jr. et al. |
| 6,023,643 A | | 2/2000 | Jesionowski |
| 6,023,727 A | * | 2/2000 | Barrett et al. .............. 709/221 |
| 6,266,809 B1 | * | 7/2001 | Craig et al. ................ 717/173 |
| 6,622,302 B1 | * | 9/2003 | Delaney et al. ............. 717/170 |

FOREIGN PATENT DOCUMENTS

JP        11003213        1/1999

OTHER PUBLICATIONS

U.S. Appl. No. 09/573,530, filed May 19, 2000, entitled, "High Availability Work Queuing in an Automated Data Storage Library", invented by B.G. Goodman and L.G. Jesionowski, including Amendments to Claims dated Aug. 7, 2001.

U.S. Appl. No. 09/573,531, filed May 19, 2000, entitled, "Automated Data Storage Library Distributed Control System", invented by B.G. Goodman;, L. G. Jesionowski; M.P. McIntosh; F. Quintana; C.A. Thompson, Jr.; and R. Yardy, including Amendments to Claims dated Aug. 16, 2001.

* cited by examiner

*Primary Examiner*—Anthony Knight
*Assistant Examiner*—Thomas Pham
(74) *Attorney, Agent, or Firm*—David W. Victor; Konrad Raynes & Victor LLP (57) ABSTRACT

Provided is a method, system, and program for updating the firmware in a nodal system. The nodal system includes at least two nodes, wherein each node includes a processing unit and a memory including code. The nodes communicate over a communication interface. At least one querying node transmits a request to at least one queried node in the nodal system for a level of the code at the node over the communication interface. At least one node receives a response from the queried node receiving the request indicating the level of code at the queried node over the communication interface. The node receiving the response determines whether at least one queried node has a higher code level.

36 Claims, 4 Drawing Sheets

AUTOMATIC FIRMWARE UPDATE OF PROCESSOR NODES

BACKGROUND OF THE INVENTION

1. Field of the Invention

The present invention relates to the field of nodal architecture. In particular, the present invention relates to a system and method for maintaining proper firmware levels in the nodes of a system.

2. Description of the Related Art

Nodes are understood in the prior art to refer to a chip set or an assembly that contains a processor and associated electronics connected together on a network. Many devices are based on a nodal architecture wherein a plurality of distributed processing nodes communicate over a bus or network interface, such as a Local Area Network (LAN), a Controller Area Network (CAN), etc. A CAN network is typically used for distributed computing nodes in automobiles or machine control systems. Each node controls a particular function in the overall system, rather than a singular controller performing all the functions.

There are advantages in using a distributed nodal architecture as opposed to having a single controller manage all system operations. For example, maintenance and upgrading are much easier and less expensive to perform in a nodal system because less effort is involved in replacing a singular node comprising only a component of the system as opposed to replacing the entire main controller to upgrade or fix a particular function. The cost of replacing only one node in the event of a failure is substantially less than the cost of replacing the entire controller.

However, one difficulty with a nodal architecture is coordinating an upgrade to node firmware. For instance, in order to replace a node, the replacement node may have to be at the same firmware level as the other nodes in the system in order to function properly. However, the firmware level of a replacement part may be substantially different than the other system nodes, especially if the replacement node contains an older version of firmware than the component being replaced. For instance, the replacement node may have been in-stock at a warehouse for a significant period of time, during which one or more firmware updates were made to the system. Currently, there are two solutions to maintaining code levels on processor assemblies. The first involves maintaining replacement nodes in the warehouse at current firmware levels. This solution is costly and time consuming because it involves turning the stock every time a firmware change is made. The second solution is to have a maintenance technician update the firmware when a node is replaced at the customer site. This solution is also problematic because of the cost of having the technician apply the update and the potential of human error when applying the update.

Thus, there is a need in the art to provide an improved methodology for maintaining the proper firmware level in a nodal system.

SUMMARY OF THE PREFERRED EMBODIMENTS

Provided is a method, system, and program for updating the firmware in a nodal system. The nodal system includes at least two nodes, wherein each node includes a processing unit and a memory including code. The nodes communicate over a communication interface. At least one querying node transmits a request to at least one queried node in the nodal system for a level of the code at the node over the communication interface. At least one node receives a response from the queried node receiving the request indicating the level of code at the queried node over the communication interface. The node receiving the response determines whether at least one queried node has a higher code level.

Further, the node receiving the response requests a copy of the code at the higher code level queried node if one queried node has the determined higher code level. The node requesting the copy of the code updates the memory with the requested copy of the higher code level from the queried node.

Described implementations provide an automatic update to firmware at computing nodes in a distributed nodal architecture. The described implementations reduce the need to ensure that warehouse stock is "turned" or updated every time a firmware update is released. Further, with the described implementations, there is no need for a technician to update the node firmware before using the replacement node. Still further, the implementations increase the likelihood that the same version of the firmware is running on all the nodes of the nodal system to avoid incompatibility problems between different firmware levels.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
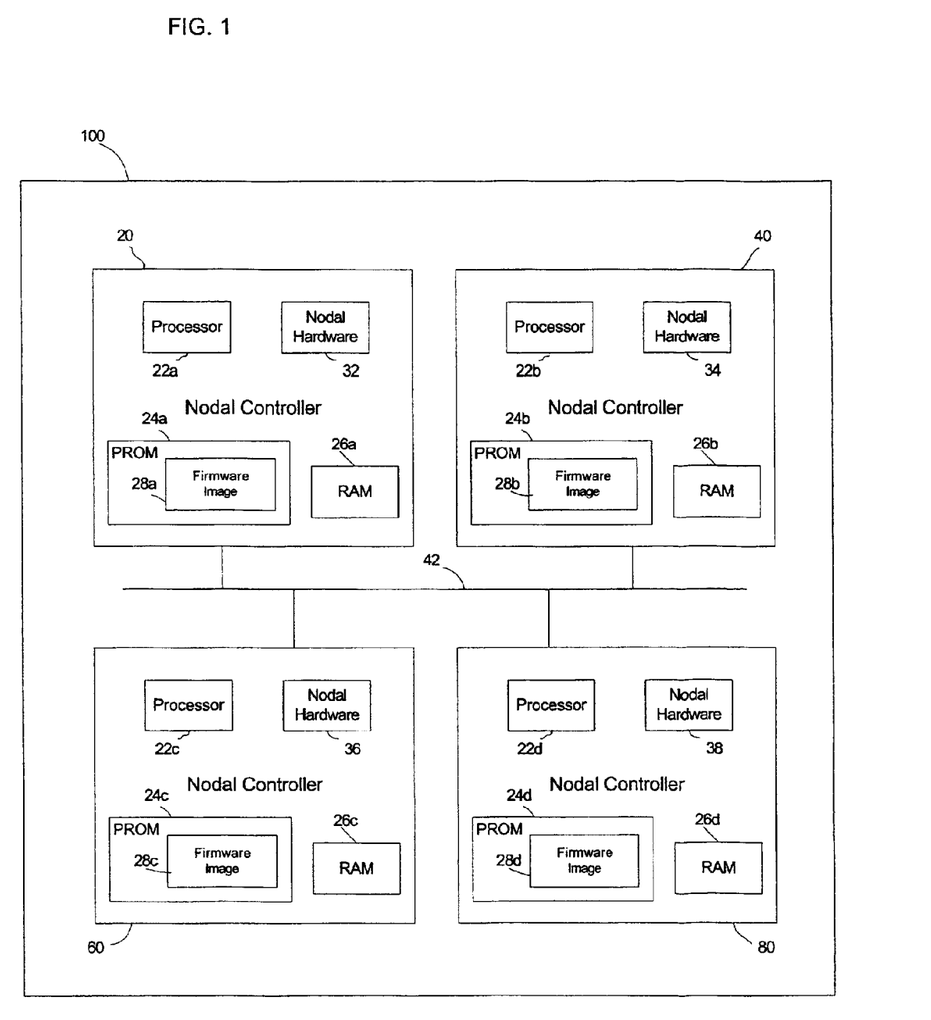
FIG. 1 is a block diagram illustrating the nodal architecture in which the preferred embodiments are implemented.

FIG. 1 illustrates a computing environment in which preferred embodiments are implemented. The computing environment describes a nodal system 100 which can be used in a variety of applications, such as automobiles, household appliances, consumer electronics, etc. However, for purposes of illustration, the preferred embodiments are described in the context of an automated data storage library. An automated data storage library is known in the art, and typically includes an array of storage cells (i.e. storage slots), that hold storage cartridges, such as optical disks or magnetic tapes that are portable and removable from the library. A motor driven accessor is used to locate, store and/or retrieve storage cartridges based on commands from a host computer. In the preferred embodiments, a nodal architecture is used to perform functions of the automated library where there are four basic nodes 20, 40, 60, and 80 interconnected by a communication interface 42, such as a differential multidrop LAN interface, Control Area Network ("CAN"), etc. Alternatively, other forms of connections between the nodes 20, 40, 60, and 80 are possible such as peer to peer connection or direct communication lines.

In automated tape library implementations, an XYC node 20 ("X-Y Card") is physically mounted on an X-Y motor of the accessor and controls the X-Y motion of the accessor to select the various storage cartridges at different locations. Another node is an OPC node 40 ("Operator Panel Card"), which is physically mounted on the LCD touch screen located on one of the library doors and is responsible for the operator input/output ("I/O") controls and other functions related to the I/O station to import/export media in the library (e.g. locking the door, sensing the when the door is open/closed, etc.). An ACC node 60 ("Accessor Controller Card") acts as the main controller of the automated library and is typically mounted on the gripper assembly. The ACC node 60 queues work from the host computer, stores configuration data, and controls the gripper servo functionality (i.e. pick & place and pivot functions). An MCC node 80 ("Medium Changer Card"), which is physically mounted on the library frame, provides an interface to the host computer and communicates host commands to the ACC node 60. Further details of a nodal storage library system are described in the commonly assigned and copending patent application entitled "Automated Data Storage Library Distributed Control System", having application Ser. No. 09/573,531 and filed May 19, 2000, which patent application is incorporated herein by reference in its entirety.

With reference to FIG. 1, each node 20, 40, 60, and 80 includes a processor 22a, b, c, d, which may comprise any microprocessor device known in the art. The processor 22a, b, c, d, operates under the control of firmware maintained in the programmable memory 24a, b, c, d, which may comprise any programmable nonvolatile memory device known in the art, such as a flash memory, electronically erasable programmable read only memory (EEPROM), battery backed-up RAM, etc. The processors 22a, b, c, d, utilize work areas in RAM memory 26a, b, c, d which may comprise any memory device known in the art. In addition, each node 20, 40, 60, 80 has distinct nodal hardware 32, 34, 36, 38 which is relevant to each nodes particular function. For example, the XYC node 20 has servo motors to move the accessor, the OPC node has door sensors for the I/O station as well as touch screen sensors for the LCD touch screen, the ACC node 60 has a backup battery located in the nodal hardware 36 since it acts as the main controller of the automated library, the MCC node 80 has communication hardware to communicate with the host system, etc.

In the preferred embodiments, copies of a firmware image 28a, b, c, d are stored in the programmable memories 24a, b, c, d. Typically, the same copy of firmware or code 28a, b, c, d is used on all the nodes, although different version or levels of the firmware can be found at the different nodes for various reasons. In preferred embodiments, each node 20, 40, 60, 80 includes the same firmware 28a, b, c, d program because the nodes share similar hardware and perform many common functions. For example, the nodes 20, 40, 60, 80 typically use the same operating system, same memory subsystem, similar code update routine, similar power on diagnostic tests, etc. Therefore, although the firmware 28a, b, c, d sets contain individual instructions for specific nodes, each firmware image 28a, b, c, d provides instructions to all the nodes in the nodal system 100. In other words, each node uses the shared functions plus those firmware functions specific to the node, and ignores those functions specific to other nodes.

The copies of the firmware 28a, b, c, d at the different nodes 20, 40, 60, 80 may have different firmware levels (i.e. firmware version). For example, during maintenance or repair, when one node is replaced by another node, the level of the firmware 28a, b, c, or d on the replacement node may differ from the firmware level at the other nodes in the nodal system 100. This difference may occur if a firmware update has been applied to the nodal system 100 while the replacement node was stocked in a warehouse. Firmware versions may also differ if, during a firmware update, the update is not applied to all nodes. For instance, one or more nodes may be unavailable, e.g., performing operations or disabled, when a firmware update is applied to the nodal system 100. Those unavailable nodes would retain their firmware versions, while the other nodes would have the more recent updated version. Incompatibility problems may occur when the nodes in the nodal system 100 have different versions of firmware 28a, b, c, d. For these reasons, it is desirable to ensure automatic firmware updates to provide a uniform code level throughout the nodal system 100.

Figure 2:
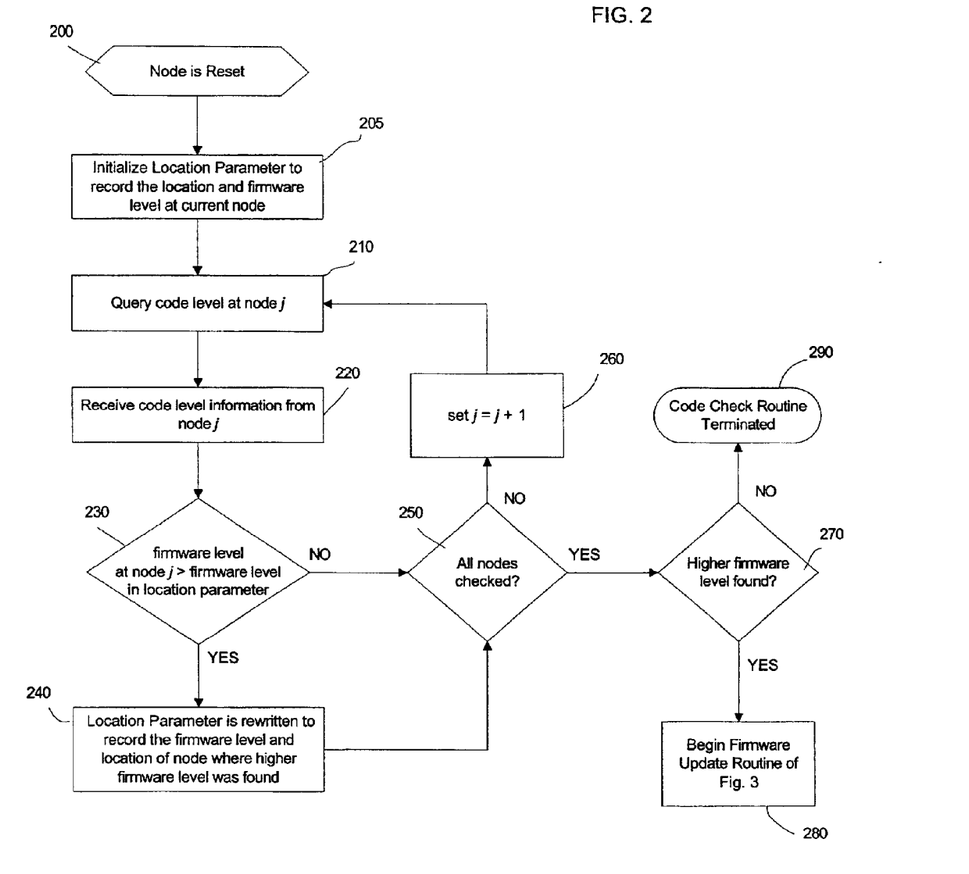
FIG. 2 illustrates the logic implemented in the firmware to instruct node processors to initiate the automatic firmware check routine in accordance with preferred embodiments of the present invention.

FIG. 2 illustrates the logic implemented in the firmware 28a, b, c, d to instruct processors 22a, b, c, d, to automatically apply firmware updates to the programmable memories 24a, b, c, d ("Code Check Routine"). The logic of FIGS. 2–3 may be implemented in the programmable memory 24a, b, c, d or any other memory device providing code to the processors 22a, b, c, d. In preferred embodiments, the automatic update process occurs each time the node 20, 40, 60, or 80 is reset (at block 200). The reset process is initiated each time a particle node or the entire nodal system 100 is powered up (i.e. turned on) or rebooted. Moreover, the nodes 20, 40, 60, 80 can also be independently reset by a firmware reset command or a user input at the node (not shown). Once the reset process is initiated at a node 20, 40, 60, 80, the firmware initially sets the Location Parameter in the RAM memory 26a, b, c, d to indicate the current node and the code level (i.e. firmware version) at the specific initializing node (at block 205). In the preferred embodiments, the Location Parameter is used to hold both the location and code level of a particular node. Alternatively, two parameters can be provided to indicate the location and code level separately.

The nodes 20, 40, 60 or 80 may each independently request a code signature from the other nodes ("a code request packet") to determine the code level (i.e. firmware version) of the firmware 28a, b, c, d that is running at the other nodes (at block 210). The code signature may include information on the version and size of the firmware used at the specific node. Once a request for a code signature is made to a node 20, 40, 60 or 80, the node receiving the request, or queried node, broadcasts its code signature to all the nodes which requested the code signature, or querying nodes. Additionally, the node receiving the request may broadcast its code signature on the bus and the other nodes would read the code signature from the communication interface 42. For example, in the case where all the nodes 20, 40, 60, 80 are reset at once and assuming that all the nodes are available for the code update routine, node 20 will request nodes 40, 60, 80 for their code signature. Then, node 40 will request nodes 20, 60, and 80 for their code signatures. Next, node 60 will request nodes 20, 40, and 80 for their code signatures, and finally, node 80 will request nodes 20, 40, and 60 for their code signatures. The order in which the code signature of nodes 20, 40, 60, 80 is requested is arbitrary, and can be based simply on the chronological order of the assigned numbering of the nodes (e.g. lowest number first, highest number first, etc.) Additionally, the code signature may be part of a node guarding (PING) process that periodically monitors the state of each node in the system.

Additionally, one or more nodes may request the code signature causing the queried node to broadcast its code signature, and nodes other than the querying node may receive the code signature broadcast as well as any subsequent broadcast of the higher level of the firmware. In this way, nodes that do not initiate the query may receive the higher level firmware update.

At block 220, the first node broadcasts its code signature to the requesting nodes. At block 230, based on the code signature received, each processor 22a, c, or d on the respective node 20, 40, 60 or 80 (except the broadcasting node) will determine whether the code signature indicates that the node providing the code signature includes a newer (or higher) version than the code level specified in the Location Parameter at the node receiving the code signature. If the version indicated in the code signature is higher than the code level at the node, then the processor 22a, b, c, or d will update (at block 240) the Location Parameter in RAM 26a, b, c, d to indicate the location and firmware level of the node with the higher firmware level. On the other hand, if the firmware version indicated in the received code signature is the same or lower than the code level indicated in the Location Parameter, then the processor 22a, b, c, or d will ignore the code signature.

At block 250, once the querying node has compared its code level with the queried node code signature, the node will check to see if all the nodes 20, 40, 60, 80 in the nodal system 100 have been checked. If all nodes have not been checked, then the checking node queries (at block 210) the next node, determined at block 260, for the code signature. This logic loop will be performed until all the nodes 20, 40, 60, 80 have been queried. If a higher code level is found at another node, then the Location Parameter is updated (at block 240) with the location and firmware level of the node. If the same higher code level is found in two or more nodes, then the logic of FIG. 2 will retain the location of the first node with the higher code level. If (at block 270) a higher firmware level was found at another node, then (at block 280) the Firmware Update Routine will initiate the copying of the higher code according to logic described in FIG. 3. However, if no higher firmware 28a, b, c, d exists at another node, then, at block 290, the Code Check Routine terminates.

Figure 3:
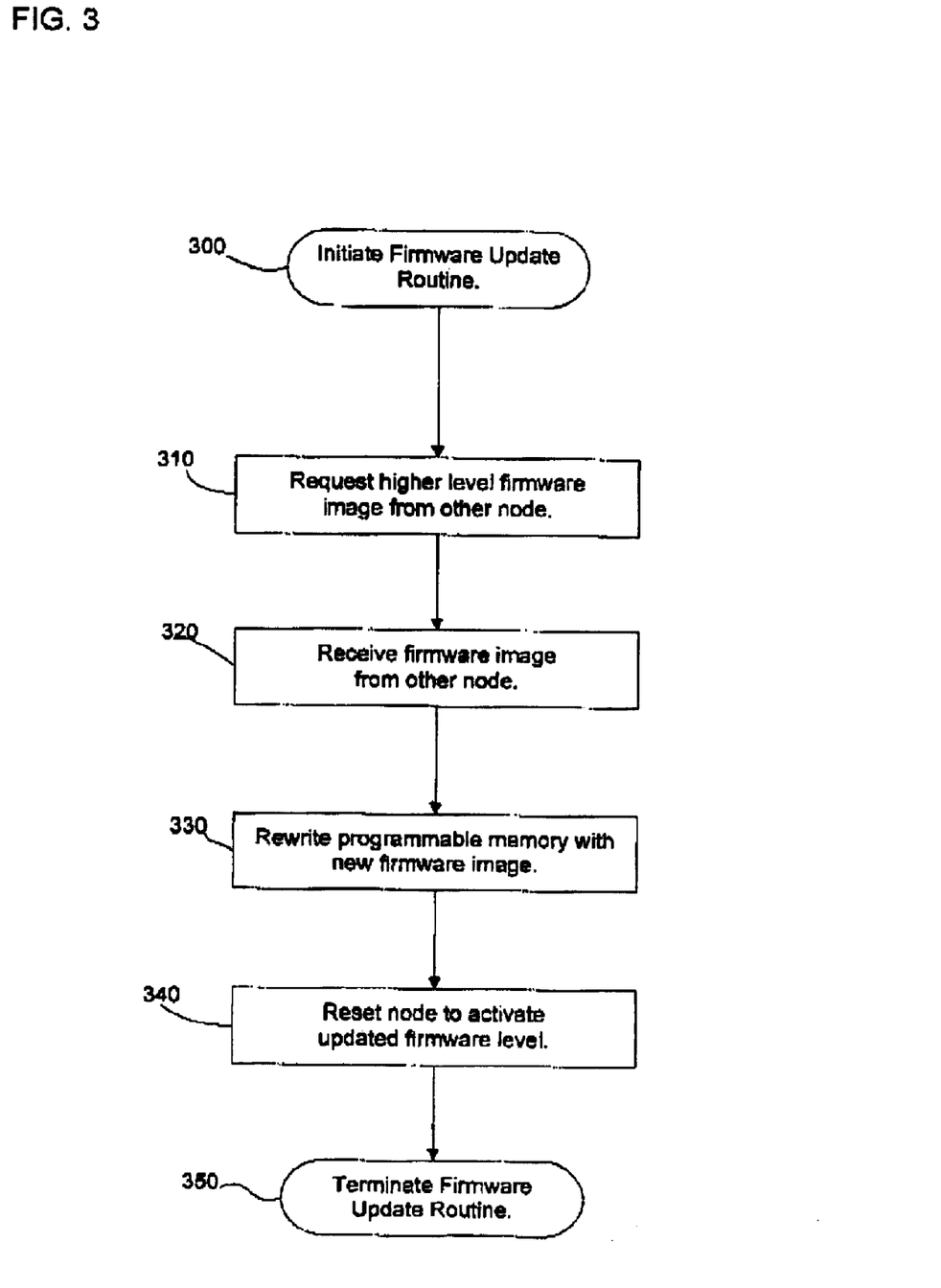
FIG. 3 illustrates the logic implemented in the firmware to automatically update the firmware on a node in accordance with preferred embodiments of the present invention.

FIG. 3 illustrates logic implemented in the firmware to automatically update the nodes that determined that other nodes have a higher code level. The processor 22a, b, c, or d then selects the node with the higher code level indicated in the Location Parameter and requests a copy of the code image (at block 310) from that node. The node receiving the request then broadcasts a copy of its firmware to all the nodes which requested a copy of its firmware. At block 320, all the requesting nodes receive a copy of the higher level firmware from the identified node. At block 330, the Firmware Update routine at each requesting node then rewrites the programmable memory with the copy of the higher level code image received from the other node. At block 340, the updated nodes reset themselves and the new firmware image is activated on those nodes. The reset nodes will execute the code check routine again in FIG. 2 and terminate upon determining that no higher firmware level exist in the nodal system 100. Additionally, in the event of a code update failure, the code update routine (FIG. 3) may perform a self node reset as a error recovery action. For instance, if a failure occurs while doing the code update, then a reset may restart the process of the code update.

Preferred embodiments are particularly useful when nodes are serviced or replaced. In fact, many of the nodes may be "hot swappable", such that the system 100 does not need to be shut down in order to remove a node for servicing (e.g. defective node) or replacement (e.g. node is upgraded or expected life of node is exceeded). Therefore when a repair technician goes to the site of the nodal system 100, the technician can simply replace the node on site without having to shut down the entire nodal system or individually reprogram the node before introducing it into to the nodal system 100. Instead, the replacement node can be individually reset by hot plugging the node in the nodal system 100. The replacement node can then execute the logic of FIG. 2 and 3 to access the highest code level from one of the other nodes in the system. This aspect is particularly useful because the firmware on the replacement node is typically in a down level (i.e. not the latest version of the firmware).

Figure 4:
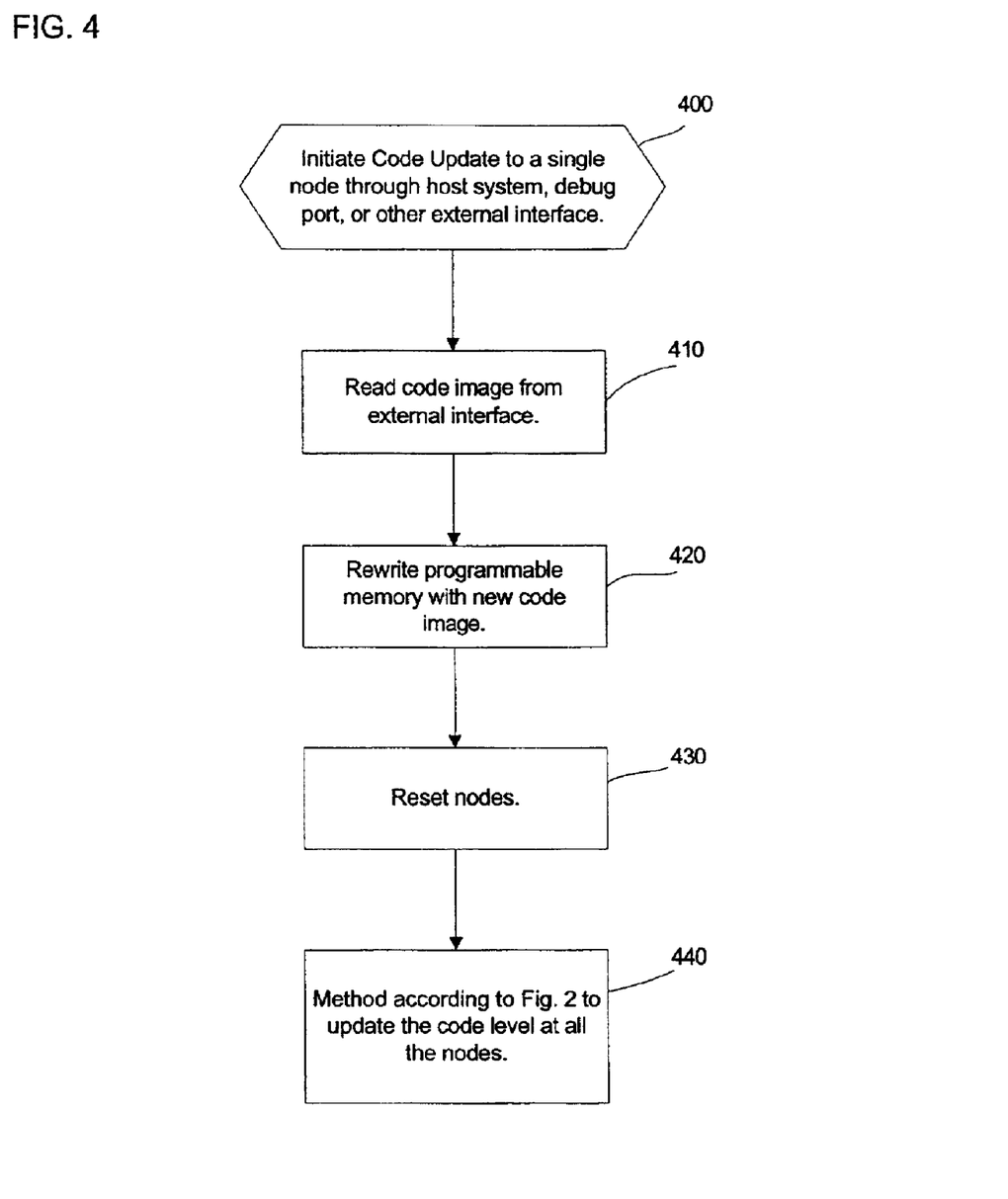
FIG. 4 illustrates logic implemented in a nodal system to install firmware throughout the nodal system in accordance with preferred embodiments of the present invention.

The preferred embodiments are also applicable during a system wide code update process described in FIG. 4. Typically, the system 100 can have updated firmware delivered through a host system, debug port, or external interface located on one or more nodes. At block 400, upon a signal from the external interface, the code update routine is initiated at the local node. Higher level code is then introduced (at block 410) to the local node through the connection made with the host system, debug port, or other external interface. The programmable memory on the local node is then updated (at block 420) to include the new version of the firmware. At block 430, the remaining nodes are then reset through a remote reset or reboot message, electrical signal or manual process, e.g., switching the power on and off, etc. Once the nodes are reset, the nodes go through the same code verification process described in FIG. 2 (at block 440). The automatic update routine of FIG. 3 will ensure that the code level will be the same at all the nodes.

In the event that multiple nodes have the same highest level code image, then in certain implementations, the querying nodes would include logic to select the same node to submit the request for the highest level code image, such as the node having the highest assigned address number. The selected queried node may then broadcast its code level to all the querying nodes on the communication interface 42 at once. Such an implementation reduces network traffic as only one node is broadcasting the high level code image on the communication interface 42.

In certain implementations, the nodes may execute the code update routine out of the incoming new code image, rather than the current (old) image stored in memory 28a, b, c, d. For instance, a node receiving an update, may execute the code update routine from the code image being transmitted to the node. In this way, the new update routine provided with the new code image, which is at a higher version level is used. This implementation is advantageous as the old code update routine preexisting in the node may not include support added to the update routine in the new code image that is needed in order to successfully complete the update to the new code image. For example, a new code image may have a different structure in memory 28a, b, c, d. The update routines in the current code image would know nothing about this new structure. As such, the code update would be applied incorrectly if the current (old) update routines were used.

If a replacement node contains a code image that is at a higher level then the code image used by the current nodes, then compatibility problems and errors may result. To avoid such code level incompatibility problems, the other nodes of the system could be reset, through a message or other means, which would cause them to be upgraded to the firmware level of the new (replacement) node. Compatibility can further be maintained by manufacturing the replacement node with an especially low firmware level to cause the other system nodes to transmit their code image to the replacement node. In yet another embodiment, the replacement node may request the highest level of firmware that does not match its own firmware level. In this case, the node would potentially downgrade itself in terms of firmware level. The node would check to see if other nodes were also performing a code check and would not allow the downgrade operation if other nodes were performing a reset.

The following describes some alternative implementations.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described embodiments, the nodal system 100 included four nodes 20, 40, 60, 80, however other nodal system can be comprised of more or less nodes throughout any particular nodal system. The logic disclosed in the preferred embodiments would be applicable to a nodal system having anywhere between two nodes to any finite number of nodes. Further, there may be more than one path from any one node to another node.

In described embodiments, a common firmware was used on all the nodes in the nodal system. However, in alternative embodiments, the firmware can be designed to have a unique independent code image for each individual node. Thus, each programmable memory will store a copy of the unique code image for that specific node along with a copy of all the other code images for the other nodes. Therefore, in the described implementations, where one node copies the code image from another node, all copies of the firmware (specific for that node and other nodes) will be transferred, or a selected copy may be requested.

The preferred logic of FIGS. 2–3 describe specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments.

In alternative embodiments, rather than the nodes looking for higher code levels at other nodes, a particular node can see if a lower code level exists at the other nodes, and send a higher code level to the other nodes if a lower code level detected. Similarly, in alternative embodiments, the program logic can be used to downgrade the code version to the lowest common firmware in the nodal system, if such a configuration was desired in an older nodal system.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for updating code in a nodal system including at least three nodes, wherein each node includes a processing runt and a memory including code, and wherein the nodes communicate over a communication interface, comprising:

transmitting, with at least one querying node, a request to at least two queried nodes in the nodal system for a level of the code at the nodes over the communication interface;

receiving with one node, responses from the queried nodes receiving the request indicating the levels of code at the queried nodes over the communication interface; and determining, with the node receiving the responses, whether one queried node has a higher code level.

2. The method of claim 1, further comprising:

retrieving, with the node receiving the response, a copy of the code at the higher code level queried node if one of the at least two queried nodes has the determined higher code level; and Updating, with the node retrieving the copy of the code, the memory with the retrieved copy of the code at the higher code level from the queried node.

3. The method of claim 1, wherein the node receiving the response from the queried nodes and determining whether the queried nodes have the higher code level comprise the querying node or a node that did not transmit the request to the queried node.

4. The method of claim 1, wherein determining whether one queried node has a higher code level is performed each time the nodal system is reset or the querying node is reset independently.

5. The method of claim 1, wherein multiple querying nodes transmit the request for the code level to at least two queried nodes, and wherein the queried nodes broadcast information on the code level to the nodes.

6. The method of claim 1, wherein the queried nodes serially transmit the code level information to the nodes.

7. The method of claim 1, wherein all nodes in the nodal system transmit the request to at least two queried nodes and determine whether the queried nodes have the higher code level.

8. The method of claim 1, wherein each node has the same code set, wherein a portion of the code includes instructions used by all the nodes in the system and wherein the code includes instructions for functions used exclusively by each of the nodes.

9. The method of claim 1, wherein a first node is capable of controlling an accessor in a storage library system to access storage cartridges and wherein a second node is capable of interfacing with a host system and communicating commands from the host system to the first node to execute.

10. The method of claim 1, wherein the at least one querying node executes a routine to transmit the requests to the at least two queried nodes, receive the response from the at least one queried node, and determine whether the at least one queried node has a higher code level than a code level indicated in a parameter in the memory, wherein the parameter is initially set to the code level of the querying node.

11. The method of claim 1, wherein the nodes further perform:
maintaining a parameter indicating the code level at the node;
initializing the parameter with the code level at the querying node before transmitting the requests for the code level at the other nodes; and
updating the parameter with the code level at the queried nodes if the queried nodes have the higher code level.

12. The method of claim 2, further comprising: broadcasting, with the queried node having the highest code level, the code to multiple nodes over the communication interface, wherein the nodes retrieve the copy of the code by reading the broadcast of the code on the communication interface.

13. A system for updating code updating a nodal system, comprising;
at least three nodes, wherein each node includes a processing unit and a memory including code;
a communication interface, wherein the nodes communicate over the communication interface;
program logic in a computer readable medium for causing the node processing units to perform:
(i) transmitting a request to at leant two queried nodes in the nodal system for a level of the code at the nodes over the communication interface;
(ii) receiving responses from the queried nodes receiving the request indicating the levels of code at the queried nodes over the communication interface; and
(ii) determining whether one queried node has a higher code level.

14. The system of claim 13, wherein the program logic is further capable of causing the node processing units that receive the response from the queried node to perform:
retrieving a copy of the code at the higher code level queried node if one of the at least two queried nodes has the determined higher code level; and
updating the memory with the retrieved copy of the code at the higher code level from the queried node.

15. The system of claim 13, wherein the node receiving the response from the queried nodes and determining whether the queried nodes have the higher code level comprising the querying node or a node that did not transmit the request to the queried node.

16. The system of claim 13, wherein determining whether one queried node has a higher code level is performed each time the nodal system is reset or the querying node is reset independently.

17. The system of claim 13, wherein multiple querying nodes transmit the request for the code level to at least two queried nodes, and wherein the queried nodes broadcast information on the code level to the nodes.

18. The system of claim 13, wherein the program logic is further capable of causing the queried node processing units to serially transmit the code level information to the nodes.

19. The system of claim 13, wherein all nodes in the nodal system transmit the request to the at least two queried nodes and determine whether the queried nodes have the higher code level.

20. The system of claim 13, wherein each node has the same program logic code set, wherein a portion of the code includes instructions used by all the nodes in the system and wherein the code includes instructions for functions used exclusively by each of the nodes.

21. The system of claim 13, wherein a first node is capable of controlling an accessor in a storage library system to access storage cartridges and wherein a second node is capable of interfacing with a host system and communicating commands from the host system to the first node to execute.

22. The system of claim 13, wherein the program logic is further capable of causing the querying node processing units to perform:
executing a routine to transmit the requests to the at least two queried nodes receive the response from the at least one queried node, arid determine whether the at least one queried node has a higher code level than a code level indicated in a parameter in the memory, wherein the parameter is initially set to the code level of the querying node.

23. The system of claim 13, wherein the program logic is further capable of causing the node processing units to perform:
maintaining a parameter indicating the code level at the node;
initializing the parameter with the code level at the querying node before transmitting the requests for the code level at the other nodes; and
updating the parameter with the code level at the queried nodes if the queried nodes have the higher code level.

24. The system of claim 14, wherein the program logic is further capable of causing the queried node processing units to perform:
broadcasting, with the queried node having the highest code level, the code to multiple nodes over the communication interface, wherein the nodes retrieve the copy of the code by reading the broadcast of the code on the communication interface.

25. An article of manufacture for updating code in a nodal system including at least three nodes, wherein each node includes a processing unit and a memory including code, wherein the nodes communicate over a communication interface, and wherein the article of manufacture comprises code in a computer readable medium capable of causing the node processing units to perform:
transmitting, with at least one querying node, a request to at least two queried nodes in the nodal system for a level of the code at the nodes over the communication interface;
receiving, with one node, responses from the queried nodes receiving the request indicating the levels of code at the queried nodes over the communication interface; and
determining, with the node receiving the responses, whether one of the queried nodes has a higher code level.

26. The article of manufacture of claim 25, wherein the article of manufacture code is further capable of causing the node processing units to perform:
retrieving, with the node receiving the response, a copy of the code at the higher code level queried node if one of the two queried nodes has the determined higher code level; and updating, with the node retrieving the copy of the code, the memory with the retrieved copy of the code at the higher code level from the queried node.

27. The article of manufacture of claim 25, wherein the node receiving the response from the queried nodes and determining whether the queried nodes have the higher code level comprises the querying node or a node that did not transmit the request to the queried node.

28. The article of manufacture of claim 26, wherein the article of manufacture code is further capable of causing the node processing units to perform:

broadcasting, with the queried node having the highest code level, the code to multiple nodes over the communication interface, wherein the nodes retrieve the copy of the code by reading the broadcast of the code on the communication interface.

29. The article of manufacture of claim 25, wherein multiple querying nodes transmit the request for the code level to at least two queried nodes, and wherein the queried nodes broadcast information on the code level to the nodes.

30. The article of manufacture of claim 25, wherein the article of manufacture code is further capable of causing the queried nodes to serially transmit the code level information to the nodes.

31. The article of manufacture of claim 25, wherein the article of manufacture code is further capable of causing all nodes in the nodal system to transmit the request to at least two queried nodes and determine whether the queried nodes have the higher code level.

32. The article of manufacture of claim 25, wherein each node has the same code set, wherein a portion of the code includes instructions used by all the nodes in the system and wherein the code includes instructions for functions used exclusively by each of the nodes.

33. The article of manufacture of claim 25, wherein a first node is capable of controlling an accessor in a storage library system to access storage cartridges and wherein a second node is capable of interfacing with a host system and communicating commands from the host system to the first node to execute.

34. The article of manufacture of claim 25, wherein the article of manufacture code is further capable of causing the querying node to execute a routine to transmit the requests to the at least two queried nodes, receive the response from the at least one queried node, and determine whether the at least one queried node has a higher code level than a code level indicated in a parameter in the memory, wherein the parameter is initially set to the code level of the querying node.

35. The article of manufacture of claim 25, wherein the article of manufacture code is further capable of causing the nodes to perform:

maintaining a parameter indicating the code level at the node;

initializing the parameter with the code level at the querying node before transmitting the requests for the code level at the other nodes; and updating the parameter with the code level at the queried nodes if the queried nodes have the higher code level.

36. The article of manufacture of claim 25, wherein determining whether one queried node has a higher code level is performed each time the nodal system is reset or the querying node is reset independently.

* * * * *

UNITED STATES PATENT AND TRADEMARK OFFICE
CERTIFICATE OF CORRECTION

PATENT NO. : 6,904,457 B2  Page 1 of 1
APPLICATION NO. : 09/755832
DATED : June 7, 2005
INVENTOR(S) : Brian Gerard Goodman It is certified that error appears in the above-identified patent and that said Letters Patent is hereby corrected as shown below:

<u>Column 8</u>, line 24, delete "runt" and insert -- unit -- .
Line 46, delete "comprise" and insert -- comprises -- .
Line 41, delete "Updating" and insert -- updating -- .

<u>Column 9</u>, line28, delete "code updating" and insert -- code in -- .
Line 36, delete "leant" and insert -- least -- .
Line 55, delete "comprising" and insert -- comprises -- .

<u>Column 10</u>, line 19, delete "nodes" and insert -- nodes, -- .
Line 20, delete "arid" and insert -- and -- .
Line 66, delete "the two queried" and insert -- the at least two queried -- .

Signed and Sealed this

Thirtieth Day of January, 2007

JON W. DUDAS
*Director of the United States Patent and Trademark Office*